INVENTORS
WILLIAM M. HILL.
PETER D. J. DICKS.

BY: Fetherstonhaugh & Co
ATTORNEYS

July 12, 1966    W. M. HILL ET AL    3,260,032
APPARATUS FOR MAKING PACKAGES
Filed June 7, 1963    2 Sheets-Sheet 2

INVENTORS
WILLIAM M. HILL.
PETER D. J. DICKS.
BY: Fetherstonhaugh & Co
ATTORNEYS 3,260,032
APPARATUS FOR MAKING PACKAGES
William M. Hill, The Gore, Ayr, Ontario, Canada, and Peter D. J. Dicks, 138 Vero Beach Blvd., Weston, Ontario, Canada
Filed June 7, 1963, Ser. No. 286,222
8 Claims. (Cl. 53—112)

This invention relates to a machine and method for packaging articles such as fruit, meat, etc., where a full view of the packaged article is desirable.

The skin packaging techniques using a rigid base and a transparent cover developed over the past few years give a good view of the article packaged, but they are relatively expensive and, therefore, not suitable for use with many food products. Moreover they are not used where a vacuum sealing is required, because of the nature of the process, it is essential that the base of the package be air pervious.

This invention contemplates a package having a rigid base and a transparent upper portion that is adhesively secured to the base at its marginal edges. It is relatively cheap to form and can be made in a variety of materials with or without a vacuum seal.

It is, therefore, an object of this invention to provide a machine and method for making a package for articles that has a strong base and a transparent skin-tight cover that can, if desired, be evacuated of air and that will maintain its vacuum.

It is a further object of the invention to provide a machine for making a package that is of good appearance and at the same time, is economical.

The objectives of the invention are achieved with a machine that consists essentially of a clamping means that includes a first ring and a base for clamping a piece of packaging film, that in most cases is heated to render it stretchable. The machine also has support means for supporting an article to be packaged on a package base in spaced relation to a piece of film in the clamping means. Means including said support means and a second ring for stretching the film retained on the clamping means over an article to be packaged, and pressing the marginal edge portion thereof against a package base on the support means are provided whereby the machine is capable of forming a package in accordance with the objects of the invention. The invention will be clearly understood after reference to the following detailed specification read in conjunction with the drawings.

In the drawings

Figure 1:
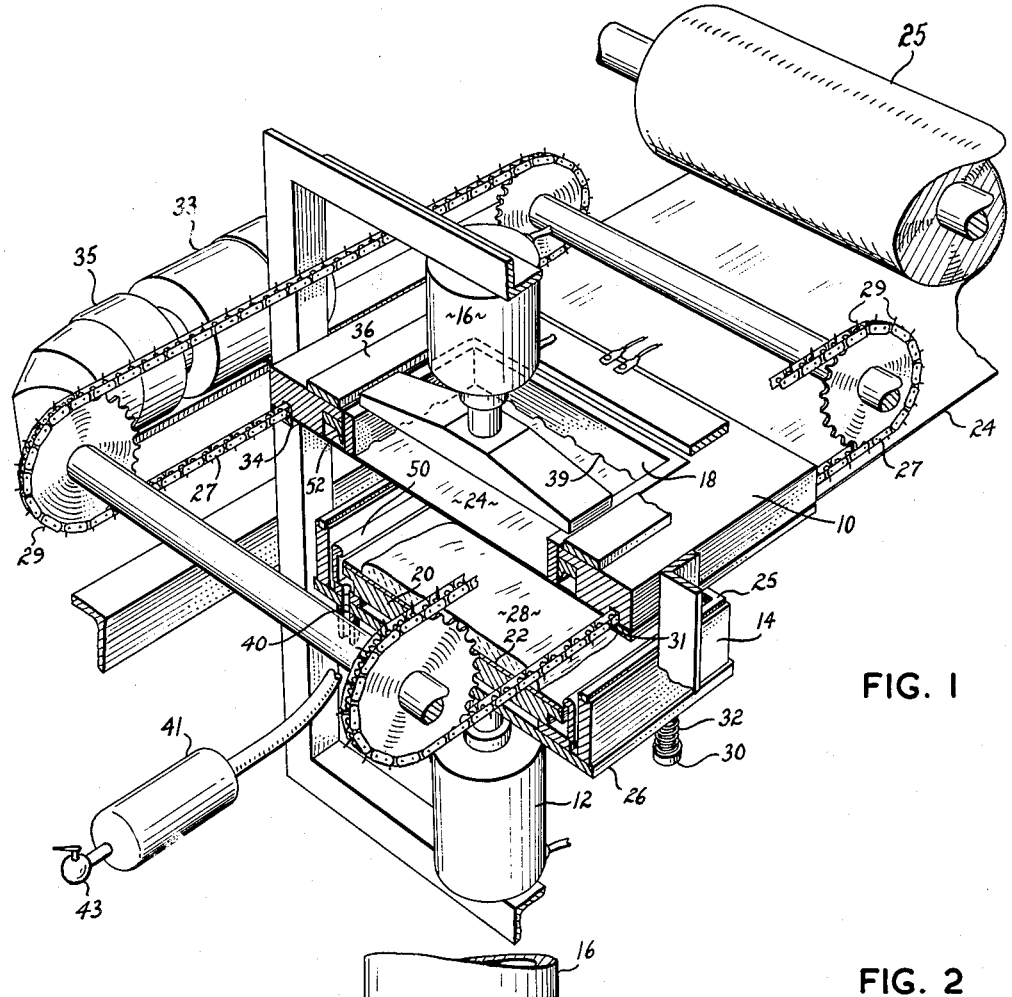
FIGURE 1 is a perspective view of a machine according to this invention.
Figure 2:
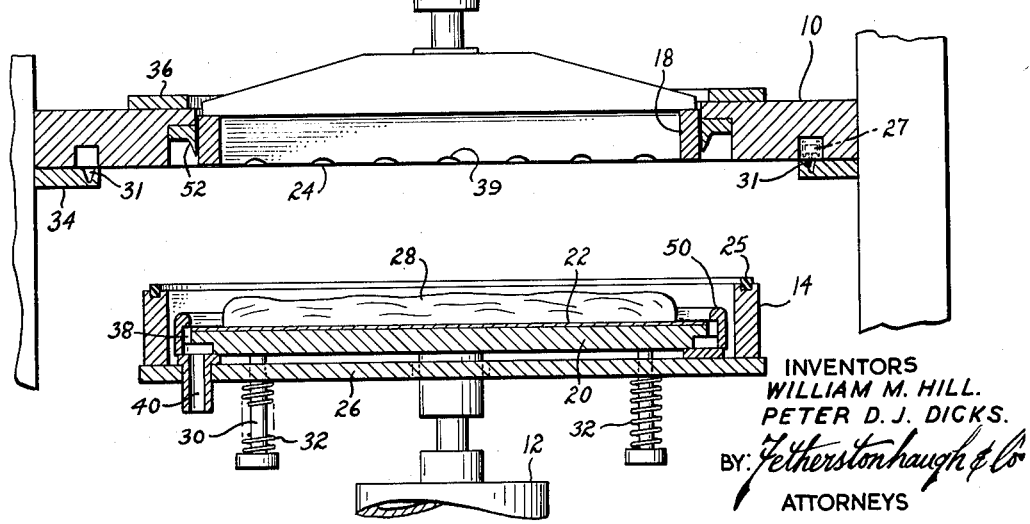
FIGURE 2 is a sectional view of a portion of the machine in elevation.
Figure 3:
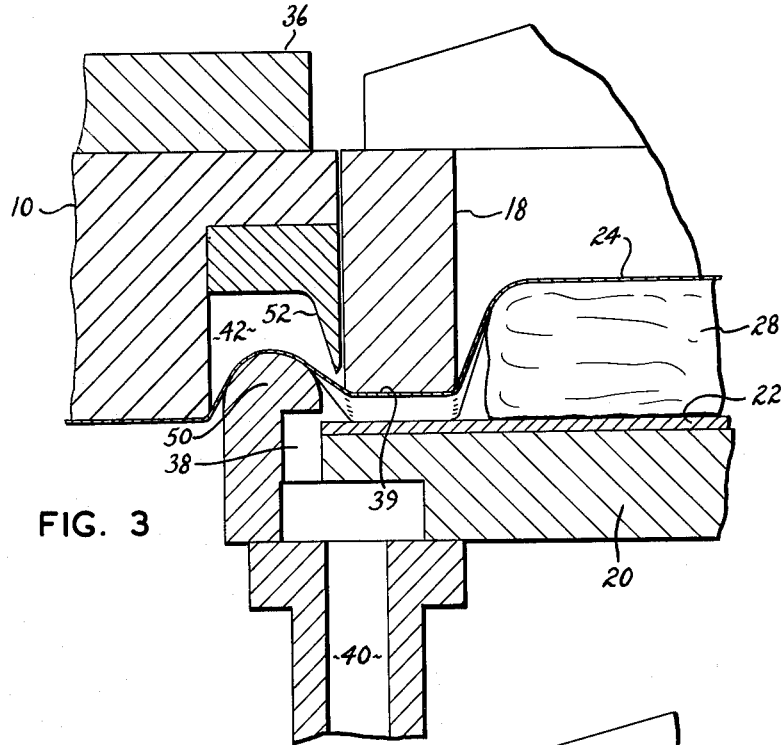
FIGURES 3 and 4 are partial sectional views showing the operation of the cutting knife.
Figure 4:
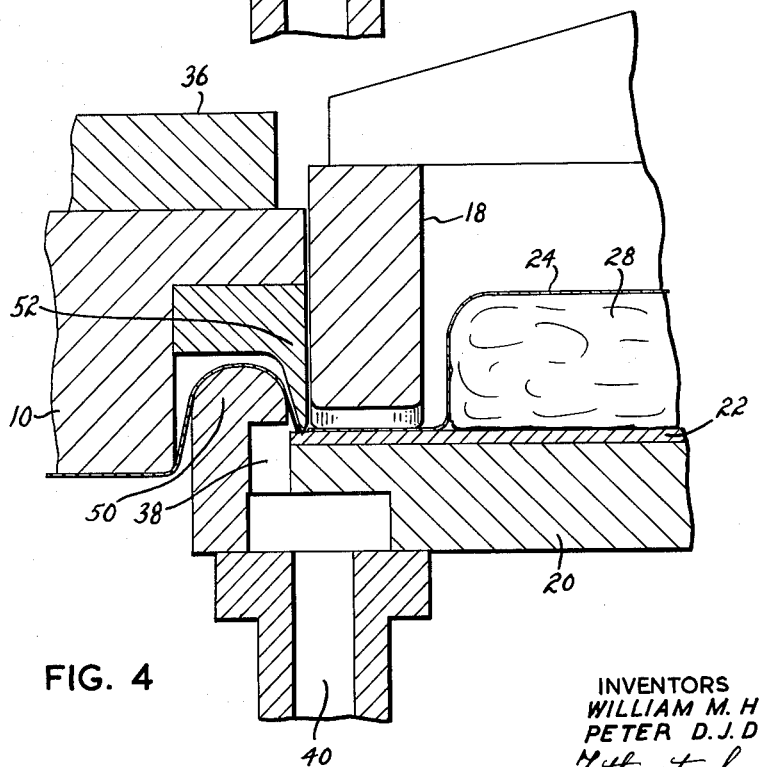

Referring to the drawings, the packaging machine there illustrated has a frame within which is rigidly mounted a first clamping base 10; a pneumatically operated cylinder 12 that in use actuates a first clamping ring 14, and a pneumatically operated cylinder 16 that in use controls a second clamping ring 18. Second clamping ring 18 cooperates in use with the second clamping base 20, which serves as a platen for the base 22 of a package as will be apparent later.

Clamping rings 14 and 18 here shown as rectangular can be of any closed shape practical for the outline of a package to be formed by the machine.

In use a piece of plastic packaging film 24 such as vinyl, polypropylene, polyethylene, polyester, is caused to underlay in abutting relation the clamping plate 10, and a piece of paper board or the like 22 adapted to form the base of a package is placed in the platen 20 that forms the clamping base.

The film 24 is drawn from the roll 25 which is suitably mounted for rotation close to the machine by endless chains 27 that run in grooves formed in the underside edges of the clamping plate 10. The chains 27 have spaced apart needles 29 thereon which enter into a track 31 secured to the underside of the base plate 10. In use the needles perforate the side edges of the film 24 and carry it along the underside of the base plate 10. The chains are powered by means of a motor 33 that is in driving relation with the shaft of the chain sprocket through a clutch 35. Means are provided for intermittently operating the chains to draw the required amount of plastic film under the base plate 10 for package formation. Control of the intermittent operation of the motor can be manual or automatic and is capable of variation that does not form a part of this invention. Detailed illustration of it, therefore, is not included.

Air supplied to cylinder 12 carries the assembly 26, upon which clamping ring 14 is mounted, upwardly to move the clamping ring 14 into clamping arrangement with the plate 10 to retain the film 24 at the points of contact. Numeral 25 refers to a rubber ring on the engaging face of clamping ring 14 for the purpose of insuring a good pressure contact all around the clamping ring 14.

An article to be packaged, referred to by the numeral 28, previously laid upon the package base 22 is carried upwardly as the assembly 26 carries the clamping ring 14 into clamping arrangement with the clamping plate 10.

The ring 14 has a depth such that the article 28 does not engage with the film 24 before the clamping ring 14 is in clamping arrangement with the clamping plate 10 to secure the film 24 in place.

It will be noted that the lifting piston of cylinder 12 connects with the underside of the clamping base 20. Four posts 30 extend downwardly from the platen 20 and through the assembly plate 26. Coil springs 32 in compression normally retain the platen in contact with the assembly plate 26 as they exert their force against the underside of the platen 26 and the shoulders of the free end of the posts.

The strength of the springs 32 in such that they will yield to permit the plate 20 to rise with respect to the assembly plate 26 as the piston of cylinder 12 extends after the clamping ring 14 has engaged with the clamping plate 10 to secure the wrapping 24.

In order to assure a good seal between the film and the base, as will be referred to later, it is essential that clamping ring 14 and base plate 10 enter into clamping relation to secure the film 24 therebetween before the article 28 to be packaged engages with the film surface. In cases where a high article is to be packaged the height of the ring 14 is increased. This results in an increased stroke of the piston of cylinder 12 to carry the second ring and base plate into cooperative relation. In some instances the springs 32 will have to be modified to provide for the increased stroke, and in some other instances it may be necessary to replace them with pneumatic cylinders which are capable of greater compression than a spring.

Thus, after the film 24 has been secured between the clamping ring 14 and the clamping plate 10, further extension of the piston of cylinder 12 carries the plate 22 and the materials thereon upwardly towards the clamping ring 18. As it does so the article 28 engages with the film 24, which is heated as will be referred to again later, to stretch the film thereover.

The upward movement continues until the clamping plate 20 is in clamping arrangement with the clamping

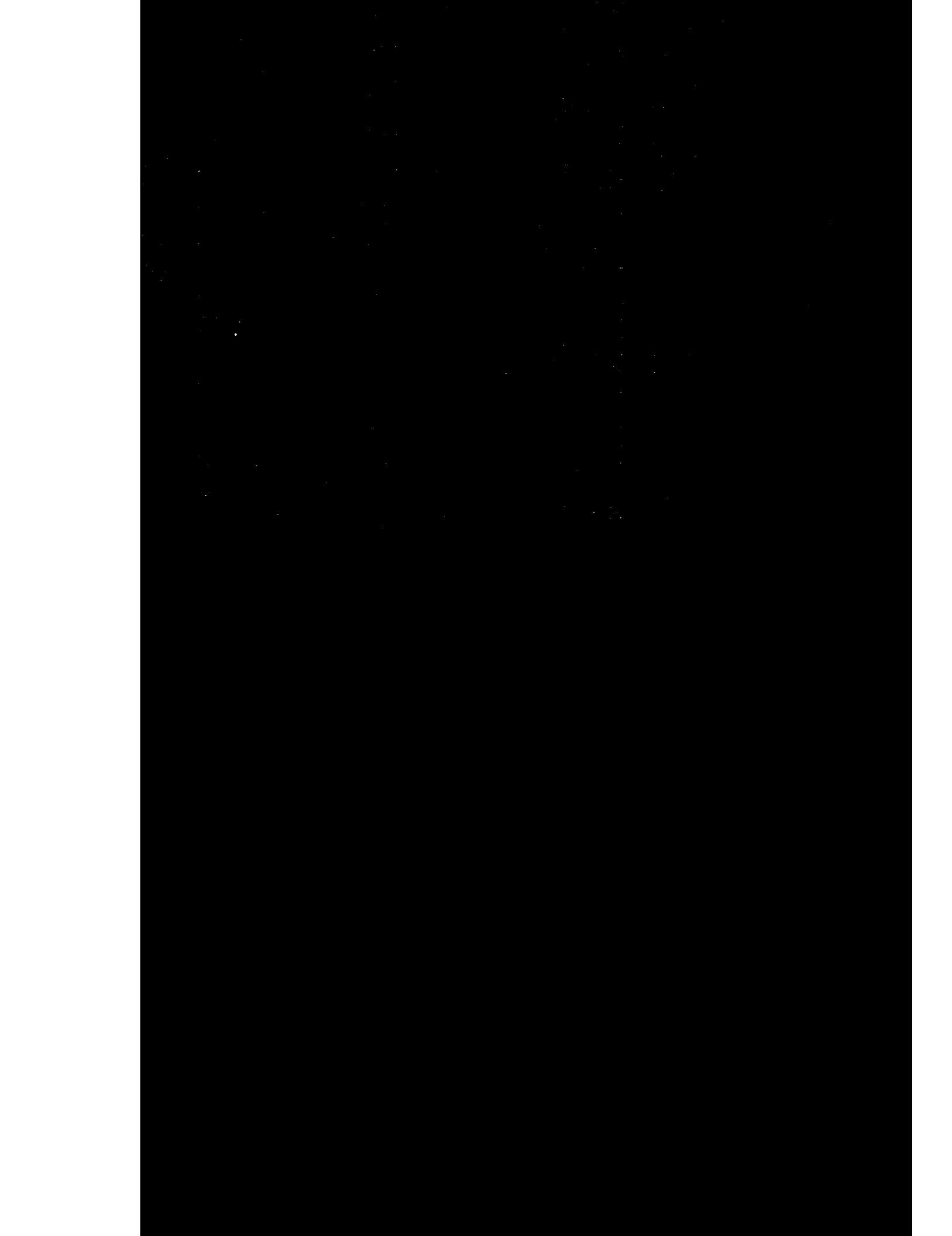

edge that extends around said second clamping ring, means carried by said second clamping base for disposing a plastic film retained by said clamping bases and said clamping rings in cutting relation to said knife, means for moving said knife and said second clamping ring and second clamping base relatively to each other to sever a plastic film retained by said clamping bases and clamping rings.

5. A packaging machine as claimed in claim 1, in which the face of said second clamping ring that cooperates with said second clamping base is formed with channel means extending thereacross, said machine having means for evacuating air through said channel means from the outer end thereof.

6. A packaging machine as claimed in claim 2, in which the face of said second clamping ring that cooperates with said second clamping base is formed with channel means extending thereacross, said machine having means for evacuating air through said channel means from the outer end thereof.

7. A packaging machine as claimed in claim 3, in which the face of said second clamping ring that cooperates with said second clamping base is formed with channel means extending thereacross, said machine having means for evacuating air through said channel means from the outer end thereof.

8. In a packaging machine clamping means including a first ring and a base for clamping a piece of packaging film, support means for supporting an article to be packaged on a package base in spaced relation to a piece of film in said clamping means, means including a film heating device and also including said support means and a second ring for stretching film retained in said clamping means over an article to be packaged and pressing a marginal edge portion thereof against a package base on said support means whereby to form a package, means for evacuating air from the interior of said package, including first passage means formed across the clamping surface of said second ring, second passage means defined by said support means and a piece of film held in said clamping means and adapted to communicate with said first passage means when said support means and second ring press the marginal edge portion of film against said support means, said second passage means being adapted to connect with a source of vacuum.

References Cited by the Examiner

UNITED STATES PATENTS

| | | | |
|---|---|---|---|
| 1,856,694 | 5/1932 | DeCorrevont | 53—22 XR |
| 2,892,294 | 6/1959 | LaBranche | 53—112 |
| 2,976,658 | 3/1961 | Kostur | 53—112 |
| 3,020,686 | 2/1962 | Rueckert et al. | 53—22 |

TRAVIS S. McGEHEE, *Primary Examiner.*